(12) United States Patent
Orilall et al.

(10) Patent No.: US 10,322,491 B2
(45) Date of Patent: Jun. 18, 2019

(54) PRINTED CHEMICAL MECHANICAL POLISHING PAD

(71) Applicant: Applied Materials, Inc., Santa Clara, CA (US)

(72) Inventors: Mahendra Christopher Orilall, Santa Clara, CA (US); Timothy Michaelson, Santa Clara, CA (US); Kasiraman Krishnan, Milpitas, CA (US); Rajeev Bajaj, Fremont, CA (US); Nag B. Patibandla, Pleasanton, CA (US); Daniel Redfield, Morgan Hill, CA (US); Fred C. Redeker, Fremont, CA (US); Gregory E. Menk, Pleasanton, CA (US)

(73) Assignee: APPLIED MATERIALS, INC., Santa Clara, CA (US)

( * ) Notice: Subject to any disclaimer, the term of this patent is extended or adjusted under 35 U.S.C. 154(b) by 0 days.

(21) Appl. No.: 14/885,955

(22) Filed: Oct. 16, 2015

(65) Prior Publication Data

US 2016/0107288 A1    Apr. 21, 2016

Related U.S. Application Data

(60) Provisional application No. 62/066,291, filed on Oct. 20, 2014, provisional application No. 62/065,190, filed on Oct. 17, 2014.

(51) Int. Cl.
*B24B 37/22*     (2012.01)
*B24B 37/24*     (2012.01)
(Continued)

(52) U.S. Cl.
CPC .............. *B24B 37/24* (2013.01); *B24B 37/22* (2013.01); *B24B 37/245* (2013.01); *B24B 37/26* (2013.01);
(Continued)

(58) Field of Classification Search
CPC ......... B24B 37/20; B24B 37/22; B24B 37/24; B24B 37/245; B24B 37/26; B24D 18/0045; B33Y 10/00; B33Y 80/00
(Continued)

(56) References Cited

U.S. PATENT DOCUMENTS 6,592,443 B1   7/2003  Kramer et al.
7,435,161 B2   10/2008 Prasad et al.
(Continued)

FOREIGN PATENT DOCUMENTS

CN    101124067 A    2/2008
CN    101166604 A    4/2008
(Continued)

OTHER PUBLICATIONS

International Search Report and Written Opinion for PCT/US2015/056021 dated Feb. 12, 2016 (11 pgs.).
(Continued)

*Primary Examiner* — Eileen P Morgan
(74) *Attorney, Agent, or Firm* — Patterson + Sheridan LLP

(57) ABSTRACT

A method of fabricating a polishing layer of a polishing pad includes successively depositing a plurality of layers with a 3D printer, each layer of the plurality of polishing layers deposited by ejecting a base material from a first nozzle and an additive material from a second nozzle and solidifying the base and additive material to form a solidified pad material.

17 Claims, 2 Drawing Sheets

(51) Int. Cl.
*B24B 37/26* (2012.01)
*B33Y 10/00* (2015.01)
*B33Y 80/00* (2015.01)
*B24D 18/00* (2006.01)

(52) U.S. Cl.
CPC .......... *B24D 18/0045* (2013.01); *B33Y 10/00* (2014.12); *B33Y 80/00* (2014.12)

(58) Field of Classification Search
USPC .......................................... 451/526, 529, 530
See application file for complete search history.

(56) References Cited

U.S. PATENT DOCUMENTS

| | | | |
|---|---|---|---|
| 7,530,880 B2 | 5/2009 | Bajaj et al. | |
| 7,815,778 B2 | 10/2010 | Bajaj | |
| 7,846,008 B2 | 12/2010 | Bajaj | |
| 8,066,555 B2 | 11/2011 | Bajaj | |
| 8,075,745 B2 | 12/2011 | Bajaj | |
| 8,177,603 B2 | 5/2012 | Bajaj | |
| 8,292,692 B2 | 10/2012 | Bajaj | |
| 9,067,299 B2* | 6/2015 | Bajaj | B24B 37/26 |
| 9,162,340 B2 | 10/2015 | Joseph et al. | |
| 2004/0106367 A1 | 6/2004 | Walker et al. | |
| 2005/0062900 A1 | 3/2005 | Kim | |
| 2006/0192315 A1* | 8/2006 | Farr | B29C 67/0081 264/113 |
| 2008/0157436 A1* | 7/2008 | Patel | B29C 67/0081 264/401 |
| 2010/0203815 A1* | 8/2010 | Bajaj | B24B 37/26 451/446 |
| 2012/0315830 A1 | 12/2012 | Joseph et al. | |
| 2013/0283700 A1* | 10/2013 | Bajaj | B24B 37/26 51/295 |
| 2015/0126099 A1* | 5/2015 | Krishnan | B33Y 10/00 451/529 |
| 2015/0273770 A1* | 10/2015 | Bajaj | B24B 37/26 425/166 |
| 2016/0229023 A1 | 8/2016 | Lugg et al. | |

FOREIGN PATENT DOCUMENTS

| | | | |
|---|---|---|---|
| JP | 2000061817 A | 2/2000 | |
| JP | 2008539093 A | 11/2008 | |
| KR | 20130092625 A | 8/2013 | |
| TW | 200924907 A | 6/2009 | |
| TW | 201350265 A | 12/2013 | |
| WO | 2009158665 A1 | 12/2009 | |
| WO | WO 2013162856 A1 * | 10/2013 | B24B 37/26 |

OTHER PUBLICATIONS

Chinese Office Action dated Sep. 5, 2018, for Chinese Application No. 201580056353.6.
Taiwan Office Action dated Feb. 21, 2019, for Taiwan Patent Application No. 104131878.
Wikipedia—"Cross-link" webpage at <https://en.wikipedia.org/wiki/Cross-link>, printed Mar. 8, 2019, 8 pages.

* cited by examiner

PRINTED CHEMICAL MECHANICAL POLISHING PAD

CROSS-REFERENCE TO RELATED APPLICATIONS

This application claims benefit of U.S. Provisional Application Ser. No. 62/065,190, filed Oct. 17, 2014, and U.S. Provisional Application Ser. No. 62/066,291, filed Oct. 20, 2014, both of which are incorporated by reference in their entirety.

BACKGROUND

Field

This present invention relates to polishing pads used in chemical mechanical polishing.

Description of the Related Art

Reliably producing nanometer and smaller features is one of the key technology challenges for next generation very large scale integration (VLSI) and ultra large-scale integration (ULSI) of semiconductor devices. However, as the limits of circuit technology are pushed, the shrinking dimensions of VLSI and ULSI interconnect technology have placed additional demands on processing capabilities. Reliable formation of gate structures on the substrate is important to VLSI and ULSI success and to the continued effort to increase circuit density and quality of individual substrates and die.

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is a process commonly used in the manufacture of high-density integrated circuits to planarize or polish a layer of material deposited on a substrate. A carrier head may provide the substrate retained therein to a polishing station of the CMP system and controllably urge the substrate against a moving polishing pad. CMP is effectively employed by providing contact between a feature side of the substrate and moving the substrate relative to the polishing pad while in the presence of a polishing fluid. Material is removed from the feature side of the substrate that is in contact with the polishing surface through a combination of chemical and mechanical activity.

One objective of a chemical mechanical polishing process is polishing uniformity. If different areas on the substrate are polished at different rates, then it is possible for some areas of the substrate to have too much material removed ("overpolishing") or too little material removed ("underpolishing"). Conventional polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer. The polishing pad may be uniquely selected depending on the operation and desired result.

Polishing pads are typically made by molding, casting or sintering polyurethane materials. In the case of molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process. The formation of polishing pads is time consuming and requires multiple steps prior to a polishing pad being acceptable for CMP use.

Thus, there is a need for an improved polishing pad.

SUMMARY

A method of fabricating a polishing pad includes successively depositing a plurality of layers with a 3D printer is disclosed. Each layer of the plurality of polishing layers is deposited by ejecting a base material from a first nozzle and an additive material from a second nozzle. The base and additive material are solidified to form a solidified pad material is disclosed.

DESCRIPTION OF DRAWINGS

So that the manner in which the above recited features of the embodiments can be understood in detail, a more particular description of the embodiments, briefly summarized above, can be had by reference to embodiments, some of which are illustrated in the appended drawings. It is to be noted, however, that the appended drawings illustrate only examples of the embodiments and are therefore not to be considered limiting of its scope, for the disclosure can admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1A:
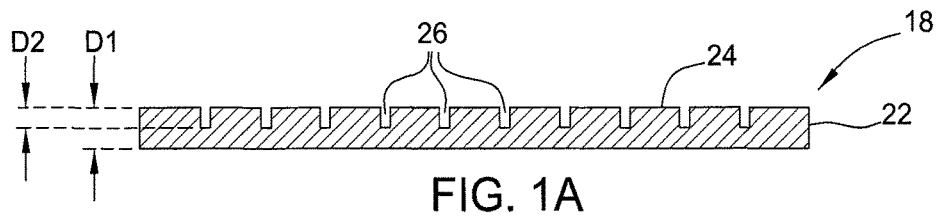
FIG. 1A is a schematic cross-sectional side view of an example polishing pad.

In order to provide polishing uniformity, a polishing pad needs to form a uniform contact with the substrate being polished, such that uniform pressure can be applied across the substrate surface. A variation in thickness of the pads can create non-uniform pressure across the substrate surface. Even small variations in thickness lead to variations in the applied pressure, and hence non-uniform removal as well as higher defects such as micro-scratches on the substrate surface. This effect is more acute for hard polishing pads, and is also more acute at low pressure polish processes. Although a soft polishing pad can accommodate larger thickness variations, the process of forming grooving in the pad is more likely to generate non-uniformity in soft polishing pads.

A technique for manufacturing polishing pads that can provide improved thickness uniformity is 3D printing. In a 3D printing process, a thin layer of pad precursor, e.g., a liquid, is progressively deposited and fused to form a full 3-dimensional polishing pad.

In one example, a method of fabricating a polishing layer of a polishing pad includes successively depositing a plurality of layers with a 3D printer, each layer of the plurality of polishing layers deposited by ejecting a liquid pad material precursor from a nozzle and solidifying the pad material precursor to form a solidified pad material.

Implementations of the invention may include one or more of the following features. A thickness of each layer of the plurality of layers may be less than 50% of a total thickness of the polishing layer. A thickness of each layer of the plurality of layers may be less than 1% of a total thickness of the polishing layer. Recesses may be formed in the polishing layer by controlling ejection of the pad material precursor with 3D drawing program run on a computer to form a pattern in at least some of the plurality of layers. The recesses may be 10%-75% of the total horizontal surface area of the polishing pad. Plateaus between the recesses may have lateral dimension of 0.1 to 2.5 mm. The recesses may have a depth of 0.25 to 1.5 mm. The recesses may have a widest lateral dimension of 0.1 mm to 2 mm. The recesses may be shaped as one or more of a cylindrical, a truncated pyramid or a prism. The recesses may be grooves. Solidifying the pad material precursor may include curing the pad material precursor. Curing the pad material precursor may include ultraviolet (UV) curing. The pad material precursor may include a urethane acrylate oligomer or acrylate monomer. The solidified pad material may include polyurethane. Abrasive particles may be supplied in the solidified pad material. The abrasive particles may be metal oxide particles. A backing layer of the polishing pad may be formed by successively depositing a plurality of layers with the 3D printer. Forming the backing layer may include curing the plurality of layers of the backing layer by a different amount than the plurality of layers of the polishing layer. Forming the backing layer may include injecting a different material than the pad precursor material. The solidified polishing material may have a Shore D hardness between about 30 to about a 90 in some areas while having a Shore A hardness between about 26 to about 95 in other areas of the pad. The pad material precursor may be a melted pad material and solidifying the pad material precursor may include cooling the melted pad material.

Advantages of the invention may include one or more of the following. A polishing pad can be manufactured with very tight tolerance, i.e., good thickness uniformity. Grooves can be formed in the polishing pad without distorting the thickness uniformity. Polishing uniformity across the substrate may be improved, particularly at low pressures such as below 0.8 psi, or even below 0.5 psi or 0.3 psi. The pad manufacturing process is adaptable to different polishing pad configuration and groove patterns. A polishing pad can be manufactured faster and cheaper.

Figure 1B:
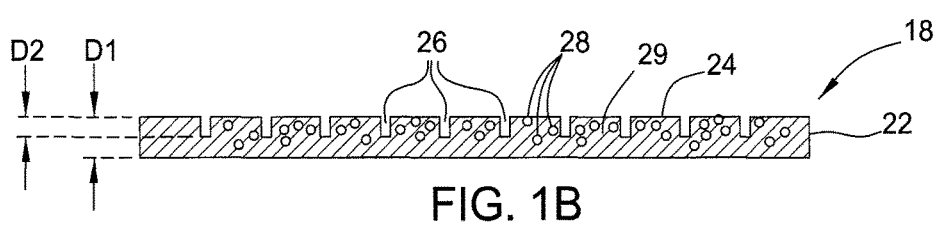
FIG. 1B is a schematic cross-sectional side view of another example polishing pad.
Figure 1C:
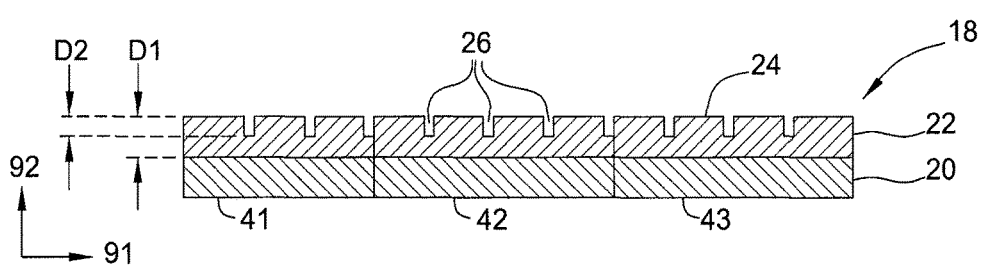
FIG. 1C is a schematic cross-sectional side view of yet another example polishing pad.

Referring to FIG. 1A-1C, a polishing pad 18 includes a polishing layer 22. As shown in FIG. 1A the polishing pad 18 can be a single-layer pad that consists of the polishing layer 22, or as shown in FIG. 1C the polishing pad 18 can be a multi-layer pad that includes the polishing layer 22 and at least one backing layer 20.

The polishing pad 18 may have one or more zones, such as first zone 42, a second zone 41 and a third zone 43. The zones 42, 41, 43 may be discrete areas having different characteristics. The one or more zones 42, 41, 43 may have additives incorporated into each zone to alter properties of the polishing pad 18. For example, zones 41 and 43 may be stiffer then zone 42. The zones 42, 41, 43 may also have a different abrasive, thermal or other properties. This may be accomplished by using different types and/or amounts of additives in at least two of the zones 42, 41,43.

The polishing layer 22 can be a material that is inert in the polishing process. The material of the polishing layer 22 can be a plastic, e.g., a polyurethane. In some implementations the polishing layer 22 is a relative durable and hard material. For example, the polishing layer 22 can have a hardness of about 30 shore D to about 90 shore D, e.g., about 50 shore D to about 65 shore D, on the Shore D scale. In other softer areas, the polishing layer 22 may have a Shore A hardness between about 26 shore A to about 95 shore A.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane. The abrasive particles 28 are harder than the material of the matrix 29. The abrasive particles 28 can make up about 0.05 weight (wt) % to about 75 wt % of the polishing layer. For example, the abrasive particles 28 can be less than about 1 wt % of the polishing layer 22, e.g., less than about 0.1 wt %. Alternatively, the abrasive particles 28 can be greater than about 10 wt % of the polishing layer 22, e.g., greater than about 50 wt %. The material of the abrasive particles can be a metal oxide, such as ceria, alumina, silica or a combination thereof.

The polishing layer 22 can have a thickness D1 of 80 mils or less, e.g., 50 mils or less, e.g., 25 mils or less. Because the conditioning process tends to wear away a polishing surface 24, the thickness of the polishing layer 22 can be selected to provide the polishing pad 18 with a useful service life, e.g., 3000 polishing and conditioning cycles.

On a microscopic scale, the polishing surface 24 of the polishing layer 22 can have rough surface texture, e.g., 2-4 microns rms. For example, the polishing layer 22 can be subject to a grinding or conditioning process to generate the rough surface texture. In addition, 3D printing can provide small uniform features, e.g., down to about 200 microns.

Although the polishing surface 24 can be rough on a microscopic scale, the polishing layer 22 can have good thickness uniformity on the macroscopic scale of the polishing pad itself (this uniformity refer to the global variation in height of the polishing surface 24 relative to the bottom surface of the polishing layer, and does not count any macroscopic grooves or perforations deliberately formed in the polishing layer). For example, the thickness non-uniformity can be less than about 1 mil.

Optionally, at least a portion of the polishing surface 24 can include a plurality of grooves 26 formed therein for carrying slurry. The grooves 26 may be of nearly any pattern, such as concentric circles, straight lines, a cross-hatched, spirals, and the like. Assuming grooves are present, then the polishing surface 24, i.e., the plateaus between the grooves 26, can be about i.e., can be 25-90% of the total horizontal surface area of the polishing pad 18. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., about 40%, of the thickness of the polishing layer 22. The depth of the grooves 26 can be about 0.25 mm to about 1 mm. For example, in a polishing pad 18 having a polishing layer 22 that is about 50 mils thick, the grooves 26 can have a depth D2 of about 20 mils.

The backing layer 20 can be softer and more compressible than the polishing layer 22. The backing layer 20 can have a hardness of 80 or less on the Shore A scale, e.g., a hardness of less than about 60 Shore A. The backing layer 20 can be thicker or thinner or the same thickness as the polishing layer 22.

For example, the backing layer 20 can be an open-cell or a closed-cell foam, such as polyurethane or polysilicone with voids, so that under pressure the cells collapse and the backing layer compresses. A suitable material for the backing layer is PORON 4701-30 from Rogers Corporation, in Rogers, Conn., or SUBA-IV from Rohm & Haas. The hardness of the backing layer can be adjusted by selection of the layer material and porosity. Alternatively, the backing layer 20 may be formed from the same precursor and have the same porosity as the polishing layer, but has a different degree of curing so as to have a different hardness.

Figure 2:
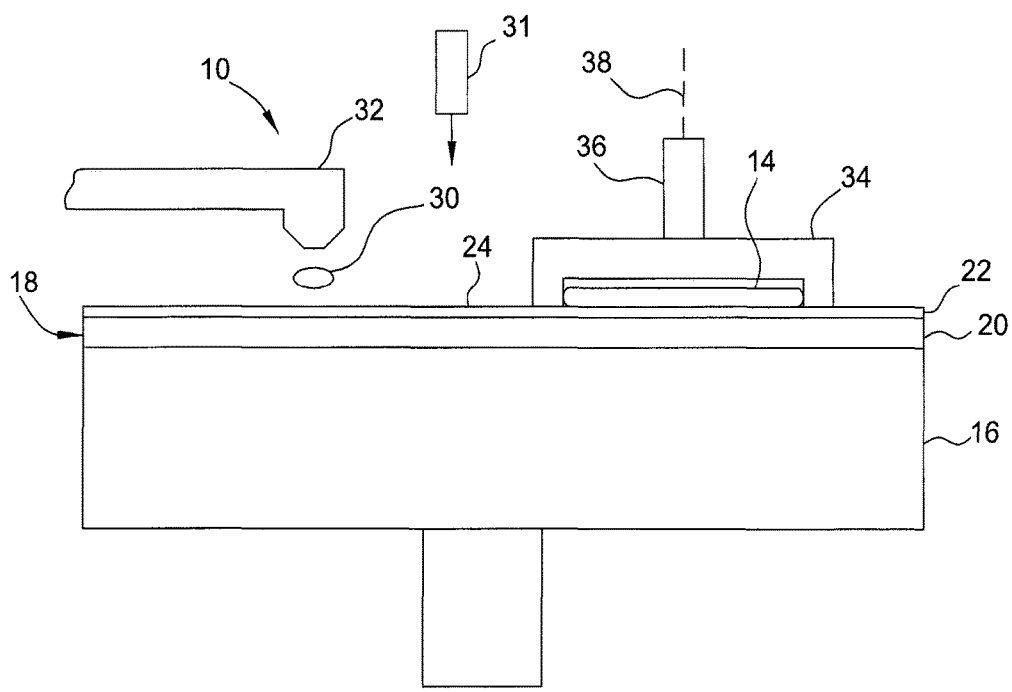
FIG. 2 is a schematic side view, partially cross-sectional, of a chemical mechanical polishing station.

Turning now to FIG. 2, one or more substrates 14 can be polished at a polishing station 10 of a CMP apparatus. The polishing station 10 can include a rotatable platen 16 on which is placed the polishing pad 18. During a polishing step, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components. Additionally, the polishing station 10 may have a laser 31 for scanning the polishing pad 18. The laser 31 may be used for reconditioning the polishing pad 18 as it wears from use.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

The polishing pad 18 may be manufactured in a 3D printing process. Suitable techniques for 3D printing polishing pads 18 may generally include directed energy deposition, powder bed fusion, or sheet lamination among other techniques. For example, a polyjet 3D technique is a layer additive technology with layers as thin as 16 microns (0.0006"). The PolyJet rapid prototyping process uses high resolution ink-jet technology combined with UV curable materials to create highly detailed and accurate layers in the polishing pad 18. In another example, the 3D printer uses fused deposition modeling (FDM) to additively lay material down in layers. A filament or wire of the polishing pad material is unwound from a coil and fused together to produce the polishing pad. In yet another example, the 3D printer inkjets a binder into a powder bed. This technique is known as "binder jetting" or "drop-on-powder". The powder bed may contain the additives as well as the base materials for producing the polishing pad. The inkjet print head moves across a bed of powder, selectively depositing a liquid binding material. A thin layer of powder is spread across the completed section and the process is repeated with each layer adhering to the last. In another example, the polishing pad may be 3D printed using selective laser sintering. A laser or other suitable power source sinters powdered material by aiming the laser automatically at points in the powder defined by a 3D model. The laser binds the material together to create a solid structure. When a layer is finished, the build platform moves down and a new layer of material is sintered to form the next cross section of the polishing pad. Repeating this process builds up the polishing pad one layer at a time. Selective laser melting (SLM) uses a comparable concept, but in SLM the material is fully melted rather than sintered allowing for different crystal structure, porosity, among other properties. In another example, the polishing pad is 3D printed using stereolithography (Vat Photopolymerization). The vat photopolymerization process builds the polishing pad by using light, such as a UV laser or another similar power source, to selectively cure layers of material in a vat of photopolymer or photo-reactive resin. Another stereolithography technique is digital light processing. Digital light processing (DLP) uses a projector to project the image of the cross section of an object into a vat of the photopolymer. The light selectively hardens only the area specified in that image. The most recently printed layer is then repositioned to leave room for unhardened photopolymer to fill the newly created space between the print and the projector. Repeating this process builds up the object one layer at a time. A layer generated using DLP may have a layer thickness of under 30 microns. In another example, a polishing pad is generated using sheet lamination. The polishing pad is manufactured by layering sheets of material on top of one-another and binding them together. The 3D printer then slices an outline of the polishing pad into the bound sheets of material. Repeating this process builds up the polishing pad one layer (sheet) at a time. In yet another example, the polishing pads are generated using directed energy deposition (DEP). DEP is an additive manufacturing process in which focused thermal energy is used to fuse materials by melting them. The material may be fed into a molten pool created by an electron beam which is then guided by a computer to move about to form a layer of the polishing pad on a build platform. It should be appreciated that example techniques are suitable for 3D printing the polishing pad as are other 3D printing techniques.

It should be appreciated that the additives may or may not have a homogenous concentration in the base material across the polishing pad. The additives may gradually change in concentration in different areas of the polishing pad. Regions of different concentration may have a radial, azimuthal, polar, grid or other spatial relationship. For example, the additives may gradually decrease or increase in concentration across the polishing pad in an edge to center relationship. The additives may alternately increase in discrete increments horizontally 91 (as shown in FIG. 1C) across the pad. Additionally, the additives may increase in discrete increments vertically 92 (as shown in FIG. 1C) across the pad.

Figure 3:
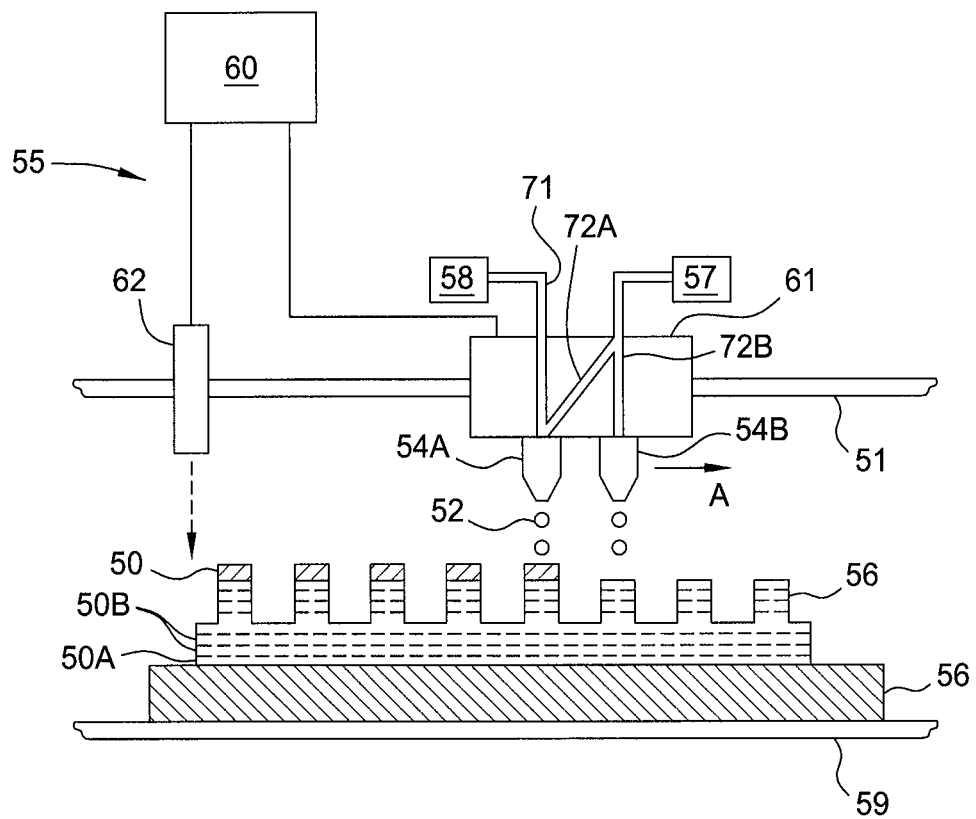
FIG. 3 is a schematic cross-sectional side view illustrating a 3D printer for fabricating the polishing pad of FIG. 1A.

Referring to FIG. 3, the polishing layer 22 of the polishing pad 18 may be manufactured using a 3D printing process, such as polyjet printing. In the manufacturing process, thin layers of material are progressively deposited and fused. For example, droplets 52 can be ejected from a nozzle 54A of a droplet ejecting printer 55 to form a layer 50. The droplet ejecting printer 55 is similar to an inkjet printer, but uses the pad precursor material rather than ink.

The droplet ejecting printer 55 may have a controller 60, a print head 61, and an energy source 62. The controller 60 may be a processing unit configured to direct the print head 61 to deposit material on a support 59 and curing the material with the energy source 62. The energy source 62 may be a UV light, such as a laser, configured to direct a beam of energy for curing the deposited material. The print head 61 and the energy source 62 translates (shown by arrow A) across a support mechanism 51. Alternately, the support 59 may articulate to provide planar access to the print head 61 and the energy source 62.

A precursor source 58 has a fluid connection 71 to the nozzle 54A. An additive source 57 may have a fluid connection 72A to nozzle 54A. In one embodiment, the droplets 52A may contain pad precursor material from the precursor source 58 and additive material from the additive source 57. Alternately, the additive source 57 may have a fluid connection 72B to a separate nozzle, such as an additive nozzle 54B. The additive nozzle 54B may deposit droplets 52B to form the layer 50 along with droplets 52A from the nozzle 54A. In another embodiment, the droplets 52A contain precursor material from the precursor source 58 and droplets 52B contain additive material from the additive source 57. The additive nozzle 54B controls the local concentration of the additive as it is applied to form the layer 50.

The droplets 52A, 52B may form a first layer 50A of material onto the support 59. For subsequently deposited layers 50B, the one or both of the nozzles 54A, 54B can eject onto the already solidified material 56. After each layer 50 is solidified, a new layer is then deposited over the previously deposited layer until the full 3-dimensional polishing layer 22 is fabricated. Each layer is applied by the nozzles 54A and 54B in a pattern stored in a 3D drawing computer program that runs on a controller 60, such as a computer. Each layer 50 may be less than 50% of the total thickness of the polishing layer 22, e.g., less than 10%, e.g., less than 5%, e.g., less than 1%.

The support 59 can be a rigid base, or be a flexible film, e.g., a layer of polytetrafluoroethylene (PTFE) for stage release or a pressure sensitive adhesive (PSA). If the support 59 is a PSA film, then the support 59 can form a portion of the polishing pad 18. For example, the support 59 can be the backing layer 20 or a layer between the backing layer 20 and the polishing layer 22. Alternatively, the polishing layer 22 can be removed from the support 59.

The transformation of the layers 50, formed from the droplets 52, into solidified material 56 can be accomplished by polymerization. For example, the layer 50 of pad precursor material can be a monomer, and the monomer can be polymerized in-situ by ultraviolet (UV) curing. Additionally, the additives may be a UV curable foam for creating porosity of a UV curable polymer-inorganic blend for altering the abrasiveness, stiffness, or creating temperature or magnetic properties in the layer 50. The pad precursor material can be cured effectively immediately upon deposition, or an entire layer 50 of pad precursor material can be deposited and then the entire layer 50 be cured simultaneously. Alternatively, the droplets 52A, 52B can be a polymer melt that solidifies upon cooling. Alternatively, the polishing layer 22 may be created by spreading a layer of powder and ejecting droplets 52A of a binder material onto the layer of powder. The powder could include additives similar to those available from in the additive source 57 for locally enhancing characteristics of the polishing pad.

As discussed supra, the additives source 57 provides one or more additives to introduce certain properties or characteristics in the layer 50 of the polishing pad 18. For example, the additives may modify the polishing pads porosity, stiffness, surface energy, abrasiveness, conductivity, chemical functionality, or other combination of characteristics for enhancing CMP operations. For example, the additives provide a friction/temperature dependent material stiffness variation, i.e. when friction or temperature increases, the additions cause the base material and thus the polishing pad 18 to become stiffer, for example to reduce dishing. The additives may enhance more than one property or characteristic of the polishing pad 18 and may be printed non-uniformly across the polishing pad 18, such as the zones 41, 42, 43 shown in FIG. 1C. For example, more additives may be added to one location and may make the polishing pad 18 stiffer then a second location having fewer additives. The additives may provide embedded chemical functionality which may change at the interface of the polishing pad and a substrate processed thereon. For example, the additive may react with the surface of a substrate, such as softening it, to facilitate mechanical polishing of the substrate surface. The unique characteristics achieved in a 3D printed pad and the additives used to bring about those characteristics are now discussed below.

Poromeric polishing pads may be created by using additives such as inkjet bubbles, foamed UV curable features, reactive jetting or other techniques for creating pores. Porosity of the polishing pad can be achieved in the final cured material by rapid mixing of the viscous formulation, followed immediately by UV curing to trap the air bubbles in place. Alternatively, small bubbles of an inert gas (such as nitrogen) can be used as an additive and introduced to the formulation, mixed and immediately cured. Pores can also be achieved by adding porogens such as polyethylene glycol (PEG), polyethylene oxide (PEO), hollow particles, or microspheres, of about 5 nm 50 µm in diameter, e.g., gelatin, chitosan, polymethylmethacrylate (PMMA), mesoporous nanoparticles, carboxyl methyl cellulose (CMC), macroporous hydrogels and emulsion microspheres. Alternatively, a leeching technique can be employed by the combination of a salt particulate (NaCl) and PEG as co-porogens wherein the salt is subsequently leeched out to form the pores.

Porosity can also be achieved by adding a UV activated species that generates gas & foaming (for example, with the help of a photoacid generator), e.g., the additional of a thermal initiator like 2,2'-Azobisisobutyronitrile (AlBN). Upon exposure to UV, the exothermic reaction of crosslinking causes the UV curable formulation to heat up which activates the AlBN, this also generates $N_2$ gas which is trapped during the curing process, leaving behind pores. Alternately, a UV curable polyurethane-acrylate (PUA) may have hollow nanoparticles for generating micropores.

The additives may also be used to enhance the abrasive qualities of a polishing pad. Exemplary inorganic (ceramic) particles may be used as additives in the printing of a polishing pad. The ceramic particles may modify the abrasive characteristics of the polishing pad. The ceramic particles may include $SiO_2$, $CeO_2$, $TiO_2$, $Al_2O_3$, $BaTiO_3$, $HfO_2$, $SrTiO_3$, $ZrO_2$, $SnO_2$, $MgO$, $CaO$, $Y_2O_3$, $CaCO_3$, $Si_3N_4$. The size, i.e., diameter, of the ceramic particles may range from about 2 nm to about 1 µm such that the UV curable polymer-inorganic blend is still inkjettable. The ceramic particles can also be core shell particles with any combination of two metal oxides comprising the core or shell. For example, in one embodiment, a UV curable and inkjetable mixture would comprise of 10-60 wt % of a polyurethane acrylate oligomer resin mixed with 40-60% acrylate monomer/reactive thinner, 0.1-10% ceria (ceramic) nanoparticles, 0-10% porogens (hollow microspheres), 0.5-5% photo initiator and 0.1-0.5% thermal inhibitor such mono-methyl ether of hydroquinone (MEHQ). The formulation yields a viscosity of about 10-20 cP at a temperature between about 25° C. and about 80° C. with a surface energy above about 24 mN/m.

The additives may be activated to crosslink into the polymer matrix of the layer. The surface of the polishing pad can be activated by a CMP pad conditioner containing a laser that ablates the polymer matrix, exposing the abrasive particles in the process. The CMP pad conditioner may be composed of one or more wavelengths of varying power for activating different additives in the polishing pad. Additionally, the laser source may be coupled to a scanning mechanism (laser 31 shown in FIG. 2) to scan across the polish pad surface and activate the additives, such as abrasive particles, which become available on the polishing layer 22 as the polishing pad 18 wears from use.

The additives may also be thermally conductive and/or enhance the thermally conductivity of a polishing pad. The thermally conductive additives in the polishing pad may provide localized regions having different temperature profiles on the substrate for generating localized temperature dependent polishing results on the substrate. Thermally conductive nanoparticles (NPs) may be used as additives and include Au, Ag, Pt, Cu, inter-metallic NPs comprising of combinations of these metal NPs (PtAu, PtAg, etc.), carbon black, carbon nanotubes, and core-shell NPs such as Fe core-carbon shell.

Similarly to the conductive additives, magnetic additives may be included in the polishing pad. An externally generated magnetic field may add to or generate a local force on the polishing pad to generate regions of different magnetic fields for local control of the polishing forces on a substrate. The magnetic particles may include Fe, Ni, Co, Gd, Dy and alloys of these metal as well as ferromagnetic particles as such as $Fe_2O_3$, $FeOFe_2O_3$, $NiOFe_2O_3$, $CuOFe_2O_3$, $MgOFe_2O_3$, MnBi, MnSb, $MnOFe_2O_3$, $Y_3Fe_5O_{12}$, $CrO_2$, MnAs, and EuO.

The additives may also include piezoelectric additives. The piezoelectric additives may be activated in the polishing pad to induce small vibrations to locally enhance polishing results. The piezoelectric materials may include tourmaline, quartz, topaz, sodium potassium tartrate tetrahydrate, PVDF, $GaPO_4$, $La_3Ga_5SiO_{14}$, $BaTiO_3$, $Pb[Zr_xTi_{1-x}]O_3$ where $0 \le x \le 1$, $KNbO_3$, $LiNbO_3$, $LiTaO_3$, $Na_2WO_3$, $Ba_2NaNb_5O_5$, $Pb_2KNb_5O_{15}$, ZnO, $((K,Na)NbO_3)$, $BiFeO_3$, $NaNbO_3$, $Bi_4Ti_3O_{12}$, $Na_{0.5}Bi_{0.5}TiO_3$, among other suitable materials.

The additives in the form of particles may be added to the material as preformed particles or as inorganic precursors for the corresponding inorganic sol-gel reaction, e.g., adding titanium chloride and titanium ethoxide would result in the formation of $TiO_2$ particles. The latter is less expensive and could further reduce the cost of the process. The major advantage of this is that all substances can be mixed at once in one solution (hence one-pot synthesis).

A number of implementations for 3D printing a polishing pad having a distribution of additives engineered to tailor the physical characteristic profile of the polishing pad and thus the polishing results. Nevertheless, it will be understood that various modifications may be made that are within the teachings of the disclosure made herein. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation.

While the foregoing is directed to embodiments of the present disclosure, other and further embodiments can be devised without departing from the basic scope thereof, and the scope thereof is determined by the claims that follow.

What is claimed is:

1. A method of fabricating a polishing pad comprising:
   successively forming a plurality of polishing pad layers using a print head of an additive manufacturing system, wherein forming a polishing pad layer comprises:
   ejecting droplets comprising a base material from one of one or more nozzles of the print head;
   ejecting droplets comprising an additive material from one of the one or more nozzles of the print head, wherein the droplets comprising the additive material are ejected from the print head independently of the droplets comprising the base material, and wherein the droplets of the additive material are ejected non-uniformly across the polishing pad; and
   polymerizing the ejected droplets of the base material to form the polishing pad layer,
   wherein the polishing pad layer comprises a polymer matrix of the base material crosslinked with the additive material,
   wherein a concentration of the additive material in the polishing pad changes in a first direction or a second direction across the polishing pad, and
   wherein the first direction is parallel to a polishing surface of the polishing pad and the second direction is orthogonal to the polishing surface.

2. The method of claim 1, wherein the additive material modifies a thermal conductivity of the polishing pad.

3. The method of claim 1, wherein the additive material modifies a porosity of the polishing pad.

4. The method of claim 1, wherein the additive material comprises piezoelectric material.

5. The method of claim 1, further comprising:
   successively depositing a plurality of layers on the plurality of polishing layers to integrally form a backing layer therewith.

6. The method of claim 5, wherein forming the backing layer comprises:
   ejecting droplets comprising a composition of material different than the composition of the base material from one of the one or more nozzles of the print head.

7. The method of claim 5, wherein the polishing layer has a Shore D hardness of about 30 Shore D to about 90 Shore D.

8. The method of claim 7, wherein the polishing layer has a Shore D hardness of about 50 Shore D to about 65 Shore D.

9. The method of claim 5, wherein the polishing layer has a Shore A hardness between about 26 Shore A to about 95 Shore A.

10. The method of claim 5, wherein at least one of the plurality of layers comprises
    two or more discrete areas having different characteristics, wherein a first discrete area comprises a first concentration of additive material and a second discrete area comprises a second concentration of additive material, and wherein the first concentration of additive material and the second concentration of additive material are different.

11. The method of claim 10, wherein the additive material modifies at least one property of the polishing layer selected from the group consisting of: porosity, stiffness, surface energy, abrasiveness, conductivity, and chemical functionality.

12. The method of claim 5, wherein the droplets of the additive material are ejected using one or more nozzles which are different from the one or more nozzles used to eject the droplets of the base material.

13. The method of claim 5, wherein a deposition rate for the additive material is independent from a deposition rate for the base material.

14. The method of claim 5, wherein ejecting droplets of the additive material from one of the one or more nozzles controls a local concentration of the additive material disposed in or crosslinked with the polymerized base material.

15. A polishing pad, comprising:
   a polishing layer comprising:
      a plurality of printer deposited layers, wherein a first layer of the plurality of layers comprises:
      a polymerized base material forming a polymer matrix; and
      an additive material crosslinked with the base material in the polymer matrix,
      wherein a concentration of the additive material in the polishing pad changes in a first direction or a second direction across the polishing pad, and
      wherein the first direction is parallel to a polishing surface of the polishing pad and the second direction is orthogonal to the polishing surface.

16. The polishing pad of claim 15, further comprising:
   a backing layer integrally formed with the polishing layer, wherein the backing layer is formed from a different material than the base material of the polishing layer.

17. The polishing pad of claim 15, wherein at least one of the plurality of layers comprising the polishing pad further comprises two or more discrete areas having different characteristics, wherein a first discrete area comprises a first concentration of additive material and a second discrete area comprises concentration of additive material and the second concentration of additive material are different.

* * * * *

UNITED STATES PATENT AND TRADEMARK OFFICE
CERTIFICATE OF CORRECTION

PATENT NO. : 10,322,491 B2
APPLICATION NO. : 14/885955
DATED : June 18, 2019
INVENTOR(S) : Mahendra Christopher Orilall et al.

Page 1 of 1

It is certified that error appears in the above-identified patent and that said Letters Patent is hereby corrected as shown below:

In the Specification

In Column 8, Line 36, delete "(A1BN)." and insert -- (AIBN). --, therefor.

In Column 8, Line 39, delete "A1BN," and insert -- AIBN, --, therefor.

In the Claims

In Column 10, Line 41, in Claim 7, delete "claim 5," and insert -- claim 1, --, therefor.

In Column 10, Line 47, in Claim 9, delete "claim 5," and insert -- claim 1, --, therefor.

In Column 10, Line 50, in Claim 10, delete "claim 5," and insert -- claim 1, --, therefor.

In Column 10, Line 64, in Claim 12, delete "claim 5," and insert -- claim 1, --, therefor.

In Column 11, Line 1, in Claim 13, delete "claim 5," and insert -- claim 1, --, therefor.

In Column 11, Line 4, in Claim 14, delete "claim 5," and insert -- claim 1, --, therefor.

Signed and Sealed this
Twentieth Day of August, 2019

Andrei Iancu
*Director of the United States Patent and Trademark Office*